United States Patent

[11] 3,609,577

[72] Inventor Marinus Anton Bos
Rockville, Md.
[21] Appl. No. 872,248
[22] Filed Oct. 29, 1969
[45] Patented Sept. 28, 1971
[73] Assignee U.S. Philips Corporation
New York, N.Y.

[54] FREQUENCY CONTROL-ARRANGEMENT
6 Claims, 1 Drawing Fig.

[52] U.S. Cl. .......... 331/17, 331/14, 331/18
[51] Int. Cl. .......... H03b 3/04
[50] Field of Search .......... 331/17,18,14

*Primary Examiner*—John Kominski
*Attorney*—Frank R. Trifari

ABSTRACT: A frequency control-arrangement for stabilizing the frequency of an oscillator having a controllable frequency on the frequency of a control-signal, in which a phase discriminator receives the control-signal and a comparison signal derived from the oscillator, said oscillator having a frequency control-input. A transmission path connects the phase discriminator to the frequency control-input of the oscillator. The frequency control-arrangement include a storage element, storage control means for storing a voltage derived from the output side of the transmission path in the storage element and means for feeding back a voltage derived from the storage element to the input side of the transmission path.

PATENTED SEP 28 1971 3,609,577
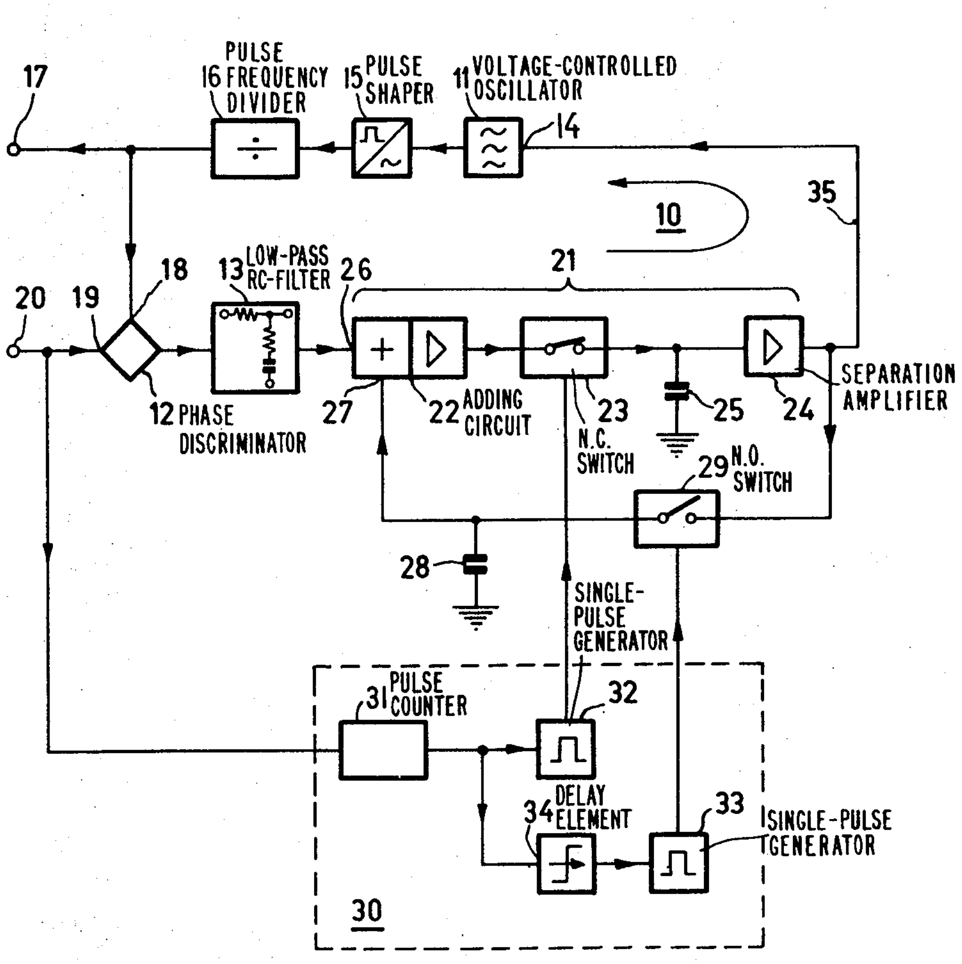
INVENTOR.
MARINUS A. BOS
BY
AGENT

FREQUENCY CONTROL-ARRANGEMENT

The invention relates to a frequency control-arrangement for stabilizing the frequency of an oscillator having a controllable frequency on the frequency of a control signal, comprising a phase discriminator to which are applied the control-signal and a comparison signal derived from the said oscillator, said oscillator having a frequency control-input, there being provided a transmission path connecting the phase discriminator to the frequency control-input of the oscillator.

Frequency control-arrangements of this kind are generally known and are employed for many purposes. In data transmission systems such frequency control-arrangements are used, for example, for regenerating a clock signal at the receiver end, that is synchronous to the incoming data signal and which clock signal is used to determine the instants when the amplitude of the data signal is significant for the transmitted information.

In such frequency control-arrangements the comparison signal in the stabilized state exhibits a given phase error which depends upon the initial frequency difference between the control-signal and the comparison signal. The presence of such a phase error may render the comparison unsuitable for direct use as a clock signal.

The invention has for its object to provide a frequency control-arrangement of the kind set forth, in which the comparison signal in the stabilized state does not exhibit a phase error and in which this state is attained from the nonstabilized state within a relatively short time.

The frequency control-arrangement in accordance with the invention is characterized in that it comprises a storage element, storage control means for storing a voltage derived from the output side of the transmission path in the storage element the storage element and means for feeding back a voltage derived from the storage element to the input side of the transmission path.

The invention will be described more fully with reference to the embodiment shown in the FIGURE.

The frequency control-arrangement shown in the FIGURE comprises mainly a phase loop 10 including inter alia a voltage-controlled oscillator 11, a phase discriminator 12 and a low-pass RC-filter 13. The voltage-controlled oscillator 11 has a control-input 14. The oscillator frequency is a function of the voltage at the control-input 14. Such an oscillator may be obtained in known manner by using a variable capacitance diode in the resonant circuit. The oscillator signal is applied through a pulse shaper 15 to a pulse frequency divider 16, which divides the oscillator frequency by a given factor. The output signal of the frequency divider 16 is applied to an output terminal 17 and to a first input 18 of the phase discriminator 12. The signal applied to said input is termed hereinafter the comparison signal. A second input 19 of the phase discriminator 12 is connected to an input terminal 20, to which during operation a control-signal is applied. The phase discriminator 12 supplied an output voltage, the amplitude of which depends upon the magnitude of the phase difference between the control-signal and the comparison signal. The RC-filter 13 produces a given amount of smoothing of the discrimination output voltage and suppresses the noise and the high-frequency interference components in this output voltage so that a stable control-voltage is obtained at the filter output. The control-voltage is applied through a transmission circuit 21, which will provisionally be left out of consideration, to a conductor 35, which is connected to the control-input 14 of the oscillator 11.

The frequency control-device so far described has the known property that after switching on a control-signal whose frequency lies in a given catching range extending on either side of the natural frequency of the oscillator the frequency of the comparison signal after a given reaction time is held stable on the frequency of the control-signal.

The phase loop 10 is characterized by a given cutoff frequency, which is to denote the frequency at which the open-loop amplification is equal to 1. The open-loop amplification is the quotient of a variation of the voltage at the control-input 14 and the resultant variation of the voltage across the conductor 35, when the connection between said conductor and the control-input is interrupted. The catching range of the phase loop approximately corresponds to the frequency range between the frequencies, one of which is the sum and the other is the difference of the oscillator frequency and the cutoff frequency. The cutoff frequency of the phase loop is normally chosen to be considerably lower than the frequency of the control-signal, for example, a factor 10 lower in order to avoid disturbance of the phase loop by signal components at the output of the phase discriminator having the same frequency as the control-signal and the comparison signal. A further reduction of the cutoff frequency may be desirable when the control-signal has a low signal-to-noise ratio and/or when a very stable comparison signal is desired. The reaction time of the phase loop to an abrupt switching on of the control-signal is approximately inversely proportional to the cutoff frequency. When the cutoff frequency is a factor 10 lower than the frequency of the control-signal, the reaction time is approximately equal to 10 periods of the control-signal.

In the stabilized state the output voltage of the phase discriminator 12 is normally shifted relatively to the zero point of the discriminator characteristic curve because such a control-voltage is produced that the resultant detuning of the oscillator 11 reduces to zero the initial frequency difference between the comparison signal and the control-signal. In the stabilized state the comparison signal exhibits a given phase error relative to the phase difference appearing at the zero point of the discriminator characteristic curve. Such a phase error is, in principle, always present in frequency control-arrangements of the kind so far described. The magnitude of the phase error depends upon the proportioning of the phase loop and the magnitude of the initial frequency difference between the comparison signal and the control-signal. In a practical embodiment the oscillator may be tunable between 2.975 MHz. and 3.025 MHz. and for detuning from one extreme frequency to the other a voltage variation of 3 v. is required and the phase discriminator supplies a variation in the output voltage of 24 v. at a phase variation of 180°. The phase error at the two extreme frequencies is then about 11°. According as the control-voltage variation required for detuning the oscillator is higher, which will be the case in a comparatively large tuning range, the phase error may be considerably greater than said value of 11°.

The frequency control-device shown in the FIGURE comprises a transmission circuit 21 including in order of succession a linear adding circuit with a separation amplifier 22, a normally closed switch 23 and a separation amplifier 24. A capacitor 25 connects the input of the amplifier 24 to a point of constant potential (earth). The adding circuit 22 has a first input 26, connected to the RC-filter 13 and a second input 27. A storage element in the form of a capacitor 28 connects the input 27 to a point of constant potential (earth). A normally opened switch 29 is connected between the output of the amplifier 24 and the input 27 of the adding circuit 22. The amplifiers 22 and 24 are buffer amplifiers having a high input impedance and a low output impedance and a low output impedance and a voltage amplification which may be equal to unity.

The switches 23 and 29 are controlled by a control-device 30 comprising a pulse counter 31, a first single-pulse generator 32, a second single-pulse generator 33 and a delay element 34. The pulse counter counts the number of control-pulses or transitions of the control signal and supplies one output pulse after each sequence of *n* control-pulses. With a reaction time of the phase loop of 10 periods of the control-signal, *n* is chosen to be 10. After the control-signal is switched on, the pulse counter 31 will supply an output pulse for the first time at the end of the reaction time of the phase loop, that is to say at the instant when the frequency of the comparison signal is stabilized on the frequency of the control-signal.

Each output pulse of the pulse counter 31 starts the single-pulse generator 32 and after a given time lag through the delay element 34 the single-pulse generator 33, which pulse generators produce each one pulse after being started. The single-pulse generator 32 opens the switch 23 during its output pulse a and the single-pulse generator 33 closes the switch 29 during its output pulse. The pulse duration of the signal-pulse generators 32 and 33 and the time lag of the delay element 34 are determined so that the switches 23 and 29 are never simultaneously closed.

After a control-signal is switched on, the switch 29 is closed for the first time at the end of the reaction time of the phase loop. In the closed state of switch 29 the capacitor 28 is rapidly charged to the output voltage of the amplifier 24. The simultaneously opened switch 23, by interrupting the transmission circuit 21, prevents the occurrence of oscillations. During the interruption of the transmission circuit the capacitor 25 maintains the output voltage of the amplifier 24 at a constant value. The voltage of the capacitor 28 is added by the adding circuit 22 to the output voltage of the filter 13 so that the output voltage of the adding circuit is doubled. After the switch 23 is closed, the doubled output voltage of the adding circuit 22 is applied via the switch 23, the amplifier 24 and the conductor 35 to the control-input of the amplifier 14. When at the switching-on instant a frequency difference $+\Delta f$ prevails between the comparison signal and the control-signal, a frequency difference $-\Delta f$ will be produced at the time instant that the control-device 30 becomes operative due to the duplication of the control-voltage. After termination of the subsequent reaction time the phase loop will have reduced to zero the frequency difference $-\Delta f$. At the instant of reaching stabilization the output voltage of the $p$ phase discriminator 12 is equal to zero and the control-voltage required for detuning the oscillator is completely supplied by the capacitor 28. The voltage of capacitor 28 has the very value required for equalizing the frequency of the comparison signal to the frequency of the control-signal. The closure of the switch 29 at the end of the last-mentioned reaction time does not produce a variation of the voltage of capacitor 28, since the output voltage of the amplifier 24, when the output voltage of the phase discriminator is equal to 0, is equal to the voltage of capacitor 28. Since at the end of the second reaction time the output voltage of the phase discriminator 11 is zero, the comparison signal no longer exhibits a phase error. The foregoing as far as it refers to switching on the control-signal also applies to variations in the frequency or the phase of the control-signal, in which case also after at the most two successive times a comparison signal without phase error is obtained.

Due to leakage current the charge of capacitor 28 may decrease between two closures of switch 29. A voltage variation of capacitor 28 is automatically compensated by the phase loop by an opposite variation of the output voltage of the phase discriminator 12. During closure of switch 29 the charge of capacitor 28 is again completed and after switch 23 is closed the output voltage of the phase discriminator again drops to zero. There is produced, it is true, a given ripple in the output voltage of the phase discriminator, but its amplitude may be kept very low by using separation amplifiers having a very high-input impedance.

In the foregoing has been assumed for the sake of simplicity that the pulse counter 31 is in the zero position at the instant when the control-signal is switched on. It will be obvious that this is not a primary condition for the satisfactory operation of the frequency control-arrangement and that at the instant of switching the pulse counter may in face be in any position. The sole difference is that two successive closures of switch 29 may be required for charging capacitor 28 to the desired voltage.

What is claimed is:

1. A frequency control-arrangement for stabilizing the frequency of an oscillator having a controllable frequency of a control-signal, comprising a phase discriminator to which are applied the control-signal and a comparison signal derived from the said oscillator, said oscillator having a frequency control-input, there being provided a transmission path connecting the phase discriminator to the frequency control-input of the oscillator, characterized in that the frequency control-arrangement comprises a storage element, storage control means for storing a voltage derived from the output side of the transmission path in the storage element, means for feeding back a voltage derived from the storage element to the input side of the transmission path.

2. A frequency control-arrangement as claimed in claim 1, characterized in that the transmission path includes a linear signal adding device, a first input of which is connected to the phase discriminator and a second input of which is connected to the storage element.

3. A frequency control-arrangement as claimed in claim 1, characterized in that the storage element is formed by a capacitor.

4. A frequency control-arrangement as claimed in claim 1, characterized in that the transmission path includes normally closed switching means and switch control means are provided for operating the said normally closed switching means in time coincidence with the operation of said storage control means.

5. A frequency control-arrangement as claimed in claim 4, characterized in that the transmission path includes a capacitor connected between the said normally closed switching means and the output side thereof for keeping the voltage at the output side at a constant value during each operation of said normally closed switching means.

6. A frequency control-arrangement as claimed in claim 1, characterized in that the storage control means comprises a counter for counting the transitions in the control signal and to provide a control pulse effecting the storage of the voltage derived from the output side of the transmission path in the storage element after each count of a fixed number of transitions.

PO-1050
(5/69)

UNITED STATES PATENT OFFICE
CERTIFICATE OF CORRECTION

Patent No. 3,609,577 Dated September 28, 1971

Inventor(s) MARINUS ANTON BOS

It is certified that error appears in the above-identified patent and that said Letters Patent are hereby corrected as shown below:

Col. 1, line 33, cancel "the storage element"

Col. 3, line 4, cancel "a"

Col. 4, line 9, "face" should be --fact--

IN THE CLAIMS

Claim 1, line 2, after "frequency" (2nd occurence) insert --on the frequency--.

Signed and sealed this 12th day of September 1972.

(SEAL)
Attest:

EDWARD M.FLETCHER,JR.
Attesting Officer

ROBERT GOTTSCHALK
Commissioner of Patents